J. H. SKELTON.
NUT LOCK.
APPLICATION FILED JUNE 6, 1910.
1,030,136.
Patented June 18, 1912.
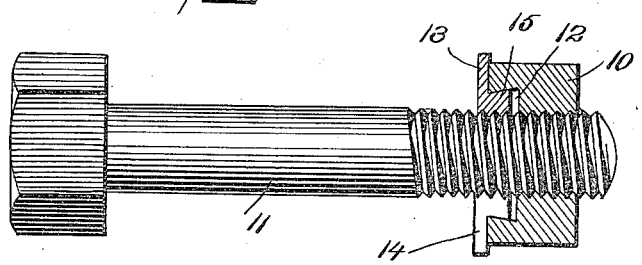
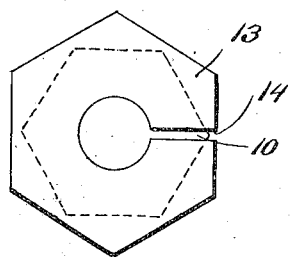
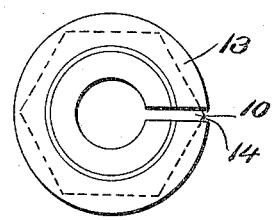
Witnesses
H. Strauss
L. Helen Fowler.
Inventor
John H. Skelton,
By Mason Fenwick & Lawrence,
Attorneys

UNITED STATES PATENT OFFICE.

JOHN H. SKELTON, OF BAYONNE, NEW JERSEY.

NUT-LOCK.

1,030,136. Specification of Letters Patent. Patented June 18, 1912.

Application filed June 6, 1910. Serial No. 565,269.

*To all whom it may concern:*

Be it known that I, JOHN H. SKELTON, a citizen of the United States, residing at Bayonne, in the county of Hudson and State of New Jersey, have invented certain new and useful Improvements in Nut-Locks; and I do hereby declare the following to be a full, clear, and exact description of the invention, such as will enable others skilled in the art to which it appertains to make and use the same.

This invention relates to nut locks and has for an object to provide a connected nut and washer whereby the washer is held in engagement with and carried by the nut.

A further object of the invention is to provide a washer screw-threaded internally to form substantially a nut with a jam nut carried by such washer and connected therewith to permit the rotation of the nut relative to the washer, but to permit free jamming action of the nut relative to such washer.

A further object of the invention is to provide a washer screw threaded to form substantially a nut such washer being slitted radially to permit contraction thereof and provided with a concentric dove-tailed portion in combination with a nut having a dove-tailed socket proportioned to receive the dove-tailed portion of the washer.

With these and other objects in view the invention comprises certain novel constructions, combinations and arrangements of parts as will be hereinafter pointed out and claimed.

In the drawings: Figure 1 is a view in side elevation of a conventional bolt with the lock nut applied thereto, such locking means being shown in section. Fig. 2 is an inverted plan view of the washer showing the nut in outline. Fig. 3 is an inverted plan view of the washer shown circular instead of polygonal, as at Fig. 2, and likewise showing the nut in outline.

Like characters of reference designate corresponding parts throughout the drawing.

A nut 10 is provided having the usual, screw threaded bore adapted to be engaged upon a complementary bolt, as shown at 11, such nut being of any size or form as desired, it being understood that the hexagonal nut as shown is only illustrative of the invention. The nut 10 is provided in its underside with a socket or recess 12 concentric with the bore and having inclined walls to produce a socket larger at the bottom than the top.

For use in association with the nut 10, a washer 13 is employed, being either round, as shown at Fig. 3, or polygonal as shown at Fig. 2, the form being immaterial, and slitted as at 14 radially of such washer. Integral with the washer is an upstanding boss 15 having inclined sides the outer end of such boss being of greater diameter than the inner end whereby the boss is made to fit within the dovetailed recess 12 of the nut 10 but shorter than the depth of such recess whereby the extremity of the boss does not contact with the bottom of the recess 12. The washer 13 with its boss 15 is associated with the nut 10 by contracting the washer by reason of the slit 14 formed therein until the dovetailed boss 15 will slip into the dovetailed recess 12 whereupon the boss and washer are expanded either by their own resiliency or mechanically to properly fit such socket and maintain the boss within the socket and washer in contact or association with the bottom of the nut.

In use the combined nut and washer are screwed upon the bolt 11 in the usual manner it not being necessary to apply a tool or implement to the washer 13 in most cases as the bore of such washer is made slightly larger and the thread connection thereby slightly looser than the threaded connection with the nut proper. When the washer has seated against the object to which it is applied the continued rotation of the nut 10 will of course force such nut down upon the washer in the usual manner of washers and will also expand the washer by reason of its engagement with the threads of the bolt.

It will thus be seen that the washer 13 performs the part of a nut which may be seated in the usual manner as shown at Fig. 2 by use of a wrench if desired and may be locked by the jam nut 10. It is of course apparent that if the jam nut 10 works loose and starts backwardly upon the bolt 11 the dovetailed socket and boss will interengage and the action of the nut will tend to clamp the lock nut or washer upon the bolt and prevent further movement of the parts.

I claim:

The combination with a bolt of a nut having a central bore threaded for application to the bolt and with a recess formed in the underside of the nut concentric therewith and with converging side walls and a washer having a central bore threaded for application to the bolt and with a boss having converging sides proportioned to be seated in the socket of the nut, such boss being no longer than the depth of the socket and a flange formed about the base of the washer positioned to engage the bottom of the nut, said washer being slitted from the central bore to its circumference.

In testimony whereof I affix my signature in presence of two witnesses.

JOHN H. SKELTON.

Witnesses:
    JOHN L. FLETCHER,
    L. L. MORRILL.

---

Copies of this patent may be obtained for five cents each, by addressing the "Commissioner of Patents, Washington, D. C."